(12) United States Patent
Idogawa et al.

(10) Patent No.: US 7,650,875 B2
(45) Date of Patent: Jan. 26, 2010

(54) FUEL INJECTION CONTROL APPARATUS AND METHOD FOR DIRECT INJECTION INTERNAL COMBUSTION ENGINE

(75) Inventors: Masanao Idogawa, Toyota (JP); Osamu Hosokawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/792,384

(22) PCT Filed: Dec. 23, 2005

(86) PCT No.: PCT/IB2005/003884

§ 371 (c)(1),
(2), (4) Date: Jun. 6, 2007

(87) PCT Pub. No.: WO2006/070258

PCT Pub. Date: Jul. 6, 2006

(65) Prior Publication Data

US 2008/0114524 A1  May 15, 2008

(30) Foreign Application Priority Data

Dec. 27, 2004  (JP) ............................. 2004-377307

(51) Int. Cl.
*F02B 7/00* (2006.01)
*F02B 7/02* (2006.01)
(52) U.S. Cl. ...................... 123/436; 123/491
(58) Field of Classification Search ................ 123/436, 123/299, 491, 179.16, 179.17, 478, 431, 123/295, 430; 73/103, 105
See application file for complete search history.

(56) References Cited

U.S. PATENT DOCUMENTS

| | | | |
|---|---|---|---|
| 5,507,265 A | 4/1996 | Ichikawa et al. | |
| 5,595,162 A * | 1/1997 | Iwai | 123/491 |
| 5,642,705 A * | 7/1997 | Morikawa et al. | 123/300 |
| 6,125,816 A * | 10/2000 | Inoue | 123/299 |
| 6,526,946 B1 * | 3/2003 | Kanno | 123/493 |
| 6,619,255 B2 * | 9/2003 | Urushihara et al. | 123/295 |
| 6,880,521 B2 * | 4/2005 | Maemura | 123/305 |
| 6,899,077 B2 * | 5/2005 | Wagner et al. | 123/295 |
| 6,904,890 B2 * | 6/2005 | Maitani et al. | 123/294 |
| 7,055,503 B2 * | 6/2006 | Shibagaki | 123/431 |
| 2001/0050072 A1 * | 12/2001 | Yomogida | 123/436 |
| 2003/0192504 A1 | 10/2003 | Nakayama et al. | |
| 2005/0039726 A1 * | 2/2005 | Ishii et al. | 123/491 |
| 2006/0169254 A1 * | 8/2006 | Wells et al. | 123/491 |

FOREIGN PATENT DOCUMENTS

| | | |
|---|---|---|
| EP | 1 365 136 A2 | 11/2003 |
| JP | B-07-059910 | 4/1988 |
| JP | A-02-049943 | 2/1990 |
| JP | A-02-081939 | 3/1990 |
| JP | A-05-044547 | 2/1993 |
| JP | B2-08-033123 | 3/1996 |
| JP | A-10-068347 | 3/1998 |
| JP | A-11-294144 | 10/1999 |
| JP | A-2001-123925 | 5/2001 |
| JP | A-2004-225658 | 8/2004 |

* cited by examiner

*Primary Examiner*—Mahmoud Gimie
(74) *Attorney, Agent, or Firm*—Oliff & Berridge, PLC (57) ABSTRACT

To quickly suppress a detected decrease in engine speed in a direct injection internal combustion engine (10), a fuel injection quantity is increased by performing a supplementary fuel injection in addition to a normal fuel injection.

25 Claims, 4 Drawing Sheets

FUEL INJECTION CONTROL APPARATUS AND METHOD FOR DIRECT INJECTION INTERNAL COMBUSTION ENGINE

BACKGROUND OF THE INVENTION

1. Field of the Invention

This invention relates to fuel injection control apparatus and method for a direct injection internal combustion engine, which increases the quantity of fuel injected when a decrease in engine speed is detected.

2. Description of the Related Art

Immediately after a cold start of an engine, fuel does not vaporize readily because some of the injected fuel adheres to the cylinder walls. As a result, the combustion state of the internal combustion engine may become unstable and the engine speed may drop. Therefore, a conventional fuel injection control apparatus for an internal combustion engine is configured to compensate for any detected decrease in engine speed by injecting more fuel than is normally injected to increase engine output, thereby suppressing the decrease in engine speed (e.g., see Japanese Patent Publication No. 8-33123).

In fuel injection control of an internal combustion engine, the fuel injection quantity must be set in advance, before the fuel is actually injected from a fuel injection valve. Therefore, a fuel injection signal indicative of the fuel injection quantity must be generated and input beforehand to a drive circuit of the fuel injection valve. Moreover, after the fuel injection quantity is set, engine control parameters such as the ignition timing and the like are set based on that fuel injection quantity.

As described above, the timing at which the injection quantity is set (hereinafter referred to as the "injection quantity setting timing") and the actual timing at which the fuel is injected (hereinafter referred to as the "actual fuel injection timing") must be set to different timings. The difference in timing poses a significant problem if the decrease in engine speed is to be suppressed quickly. That is, once the injection quantity has been set for a particular cylinder, the injection quantity cannot be increased for that fuel injection to compensate for any detected decrease in engine speed, even if a fuel injection has not yet been executed in that cylinder. Therefore, the quantity of fuel injected can only be increased for a cylinder in which an injection quantity is yet to be set after a decrease in engine speed is detected. If the engine speed drops further during this time, the likelihood of the engine stalling increases. In view of this, with the conventional injection quantity increase method, after a decrease in engine speed has been detected, that decrease is unable to be suppressed quickly, so there still remains room for improvement here.

SUMMARY OF THE INVENTION

This invention aims to provide fuel injection control apparatus and method for a direct injection internal combustion engine that are able to quickly suppress any detected decrease in engine speed.

Hereinafter, the means for achieving the foregoing aim, as well as the operational effects thereof, will be described. A first aspect of the invention relates to a fuel injection control apparatus for a direct injection internal combustion engine provided with detecting means for detecting a decrease in engine speed and injection controlling means for increasing the fuel injection quantity based on any decrease in engine speed detected by the detecting means. The injection controlling means increases the amount of fuel injected by performing a supplementary fuel injection, the injection quantity of which is set after an injection quantity setting timing of the fuel injection that is normally executed when the decrease in engine speed is not detected (hereinafter also referred to as "normal fuel injection").

With this configuration, when a decrease in engine speed is detected, the fuel injection quantity is increased by performing a supplementary fuel injection in addition to the fuel injection that is normally executed (i.e., the normal fuel injection). The fuel injection quantity of the supplementary fuel injection is set after the normal fuel injection has been set. Therefore, even if the injection quantity of the normal fuel injection has already been set when a decrease in engine speed is detected, the injection quantity of the supplementary fuel injection can be set and the supplementary fuel injection can be executed. As a result, the fuel injection quantity can be increased at an even earlier timing after the decrease in engine speed is detected, so that engine speed decrease can be quickly suppressed.

Here, the beginning of combustion (expansion) is regarded as the end of each combustion cycle. That is, in this example embodiment, each combustion cycle undergoes an expansion stroke, exhaust stroke, intake stroke, and compression stroke in this order, and the injection quantity setting timing of the supplementary fuel injection to be executed during a predetermined combustion cycle is set after the injection quantity setting timing of the fuel injection that is normally executed during the same combustion cycle.

According to a second aspect of the invention, in the fuel injection control apparatus according to the first aspect of the invention, the injection controlling means executes the normal fuel injection during an intake stroke and executes the supplementary fuel injection during a compression stroke.

According to this configuration, it is possible to ensure a longer interval of time between the injection quantity setting timing of the normal fuel injection and the injection quantity setting timing of the supplementary fuel injection, than when the normal fuel injection and the supplementary fuel injection are both performed during a single stroke, such as, for example, during the intake stroke or during the compression stroke. Accordingly, this maximizes the opportunity to detect a decrease in engine speed after the injection quantity of the normal fuel injection has been set, and execute the injection of an additional quantity of fuel based on the detection results.

According to a third aspect of the invention, in the fuel injection control apparatus according to the first or second aspect of the invention, the internal combustion engine has a plurality of cylinders, and the injection controlling means sets the period of time between the injection quantity setting timing of the normal fuel injection and the injection quantity setting timing of the supplementary fuel injection for a particular cylinder, from among the plurality of cylinders, so that it overlaps with the period of time between the injection quantity setting timing of the normal fuel injection and the injection quantity setting timing of the supplementary fuel injection for another cylinder, from among the plurality of cylinders.

According to this configuration, the time period between the injection-quantity setting timing of the normal fuel injection and the injection-quantity setting timing of the supplementary fuel injection for a particular cylinder, from among a plurality of cylinders, is set to overlap with the corresponding period for another cylinder from among the same plurality of cylinders. This overlap, for example, makes it possible to detect a decrease in engine speed after the injection quantity of the normal fuel injection has been set for each of the plurality of cylinders, so that the injection quantity of a supplementary fuel injection is then set based on the detected decrease in engine speed and the supplementary fuel injection is executed in each cylinder. Accordingly, a decrease in engine speed can be suppressed even more quickly.

According to a fourth aspect of the invention, in the fuel injection control apparatus according to any one of the first to the third aspects of the invention, the injection controlling means sets the fuel injection quantity of the supplementary fuel injection to a fixed quantity.

With this configuration, the fuel injection quantity of the supplementary fuel injection is set at a fixed quantity. As a result, the time required for setting the injection quantity of the supplementary fuel injection is reduced, so the period of time between the when the injection quantity is set and the actual fuel injection timing can be set as short as possible. Accordingly, it is possible to maximize the opportunity to detect a decrease in engine speed after the injection quantity of the normal fuel injection has been set, and an injection quantity of a supplementary fuel injection set based on those detection results and that supplementary fuel injection executed.

According to a fifth aspect of the invention, in the fuel injection control apparatus according to any one of the first to the fourth aspects of the invention, the injection controlling means continues to increase the fuel injection quantity until a predetermined period of time has elapsed after the decrease in engine speed was detected.

If the supplementary amount of fuel injected to increase the engine speed is soon reduced after the engine speed has been temporarily increased, while fluctuations in engine speed is large, as it is immediately after engine start-up, the engine speed may drop again. Therefore, executing and then canceling an increase correction of the fuel injection quantity within a short period of time may ultimately end up increasing the fluctuation in the engine speed.

Therefore, with the configuration according to the fifth aspect of the invention, once a decrease in engine speed has been detected, the supplementary fuel injection quantity is maintained until a predetermined period of time has elapsed, even if engine speed temporarily increases due to the increase in fuel injection quantity. Accordingly, even if the fluctuation in the engine speed is large, as it is immediately after engine start-up, the engine speed can still be increased stably without being adversely affected by that fluctuation.

According to a sixth aspect of the invention, in the fuel injection control apparatus according to any one of the first to the fifth aspects of the invention, the detecting means also detects whether an automatic transmission, which is drivingly connected to the internal combustion engine, is engaged to transmit engine output to a vehicle drive system. The injection controlling means also increases the fuel injection quantity when the detecting means detects both a decrease in engine speed and that the automatic transmission has been engaged to transmit the engine output to the vehicle drive system.

When the automatic transmission is transmitting engine output to the vehicle drive system, the load on the output shaft of the internal combustion engine increases, making it likely that the engine speed will decrease. Moreover, it is difficult to increase engine speed again after it has decreased due to the engagement of the automatic transmission. With the configuration according to the sixth aspect of the invention, it is possible to quickly suppress any decrease in engine speed.

According to a seventh aspect of the invention, in the fuel injection control apparatus according to any one of the first to the fifth aspects of the invention, the detecting means detects a switching of an automatic transmission from a non-engaged state to an engaged state as the decrease in engine speed, the automatic transmission being drivingly connected to the internal combustion engine to transmit the engine output to a vehicle drive system when engaged.

When the automatic transmission engaged to transmit engine output to the vehicle drive system, engine speed generally decreases due to the increased load applied the engine output shaft. With the configuration according to the seventh aspect of the invention, the increase in the fuel injection quantity can be performed when engagement of the automatic transmission is detected. As a result, a decrease in engine speed can be suppressed even faster.

The configuration according to an eighth aspect of the invention is one specific example of a configuration in which, when detecting whether the automatic transmission is engaged or about to be engaged, the detecting means regards the automatic transmission as being in the transmitting state when a shift lever of the automatic transmission is in a drive position.

According to a ninth aspect of the invention, in the fuel injection control apparatus according to any one of the first to the eighth aspects of the invention, a shift in the injection mode of the normal fuel injection from executing a compression stroke injection to executing an intake stroke injection is detected by the detecting means as a decrease in engine speed.

When the injection mode of the normal fuel injection switches from executing a compression stroke injection to executing an intake stroke injection, the area of the peripheral wall inside the combustion chamber that is exposed during the fuel injection increases. This results in a temporary increase in the amount of fuel that adheres to that inside peripheral wall. As a result, the amount of fuel that contributes to combustion is temporarily decreased, making a decrease in engine speed likely. Moreover, it is difficult to bring the engine speed back up in the event that it does decrease. The configuration according to the ninth aspect of the invention makes it possible to quickly suppress an engine speed decrease in the internal combustion engine in this state.

According to a tenth aspect of the invention, in a fuel injection control apparatus according to any one of the first to the ninth aspects of the invention, the injection controlling means executes an increase in the fuel injection quantity until a predetermined period of time has passed after engine start-up.

Engine combustion tends to be unstable immediately after engine start-up, making it likely that the engine speed will decrease. The configuration according to the tenth aspect of the invention allows quick suppression of an engine speed decrease in the internal combustion engine in this state.

An eleventh aspect of the invention relates to a method for controlling fuel injection in a direct injection internal combustion engine including a cylinder which undergoes an expansion stroke, exhaust stroke, intake stroke, and compression stroke in this order during a combustion cycle. According to this method, a normal fuel injection is set to be executed during an predetermined combustion cycle of the cylinder, and when a decrease in engine speed is detected after the normal fuel injection has been set, a supplementary fuel injection is set to be executed after the normal fuel injection during the predetermined combustion cycle of the cylinder.

According to a twelfth aspect of the invention, in the method according to the eleventh aspect of the invention, the normal fuel injection is executed during the intake stroke of the predetermined combustion cycle, and the supplementary fuel injection is executed during the compression stroke of the predetermined combustion cycle.

According to a thirteenth aspect of the invention, in the method according to the eleventh or twelfth aspect of the invention, the quantity of the supplementary fuel injection is fixed.

According to a fourteenth aspect of the invention, in the method according to any one of the eleventh to thirteenth aspects of the invention, when the decrease in engine speed is detected before the normal fuel injection has been set, the quantity of the normal fuel injection is increased based on the detected decrease in engine speed.

According to a fifteenth aspect of the invention, in the method according to any one of the eleventh to thirteenth aspects of the invention, if the supplementary fuel injection was executed during the predetermined combustion cycle, the quantity of the normal fuel injection to be executed in a subsequent combustion cycle following the predetermined combustion cycle is increased based on the detected decrease in engine speed.

According to a sixteenth aspect of the invention, in the method according to the fourteenth or fifteenth aspect of the invention, the quantity of the normal fuel injection for a subsequent combustion cycle is continuously increased based on the detected decrease in engine speed until a predetermined period time has elapsed after the decrease in engine speed has been detected.

According to a seventeenth aspect of the invention, in the method according to the fourteenth or fifteenth aspect of the invention, the quantity of the normal fuel injection for a subsequent combustion cycle is continuously increased based on the detected decrease in engine speed until a predetermined period of time has elapsed after engine start-up.

According to an eighteenth aspect of the invention, in the method according to the fourteenth aspect of the invention, the increased quantity of the normal fuel injection is equal to the combined quantities of the normal fuel injection and the supplementary fuel injection that would be injected when the decrease in engine speed is detected after the normal fuel injection has been set.

According to a nineteenth aspect of the invention, in the method according to any one of the eleventh to eighteenth aspects of the invention, it is determined whether an automatic transmission, which is drivingly connected to the internal combustion engine, is engaged to transmit engine output to a vehicle drive system, and the supplementary injection is executed if the decrease in engine speed is detected while the automatic transmission is engaged.

According to a twentieth aspect of the invention, in the method according to any one of the eleventh to eighteenth aspects of the invention, a switching of an automatic transmission from a non-engaged state to an engaged state is detected as the decrease in engine speed, the automatic transmission being drivingly connected to the internal combustion engine to transmit engine output to a vehicle drive system when engaged.

According to a twenty-first aspect of the invention, in the method according to the nineteenth or twentieth aspect of the invention, the automatic transmission is regarded as being engaged when a shift lever of the automatic transmission is in a drive position.

According to a twenty-second aspect of the invention, in the method according to any one of the eleventh to twenty-first aspects of the invention, a shift of an injection mode of the normal fuel injection from execution of a compression stroke injection to execution of an intake stroke injection is detected as a decrease in engine speed.

According to a twenty-third aspect of the invention, in the method according to any one of the eleventh to twenty-second aspects of the invention, the internal combustion engine has a plurality of cylinders and the time period between the setting of the normal injection and the setting of the supplementary injection for a first cylinder among the plurality of cylinders overlaps with the time period between the setting of the normal injection and the setting of the supplementary injection for a second cylinder among the plurality of cylinders.

According to the methods of the eleventh to twenty-third aspect of the invention, it is possible to obtain substantially the same advantages and effects as those obtained with the injection control apparatuses of the first to tenth aspects of the invention.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE PREFERRED EMBODIMENTS

Hereinafter, an example embodiment in which a fuel injection control apparatus for a direct injection internal combustion engine is applied to a direct injection V6 internal combustion engine will be described with reference to FIGS. 1 to 4.

Figure 1:
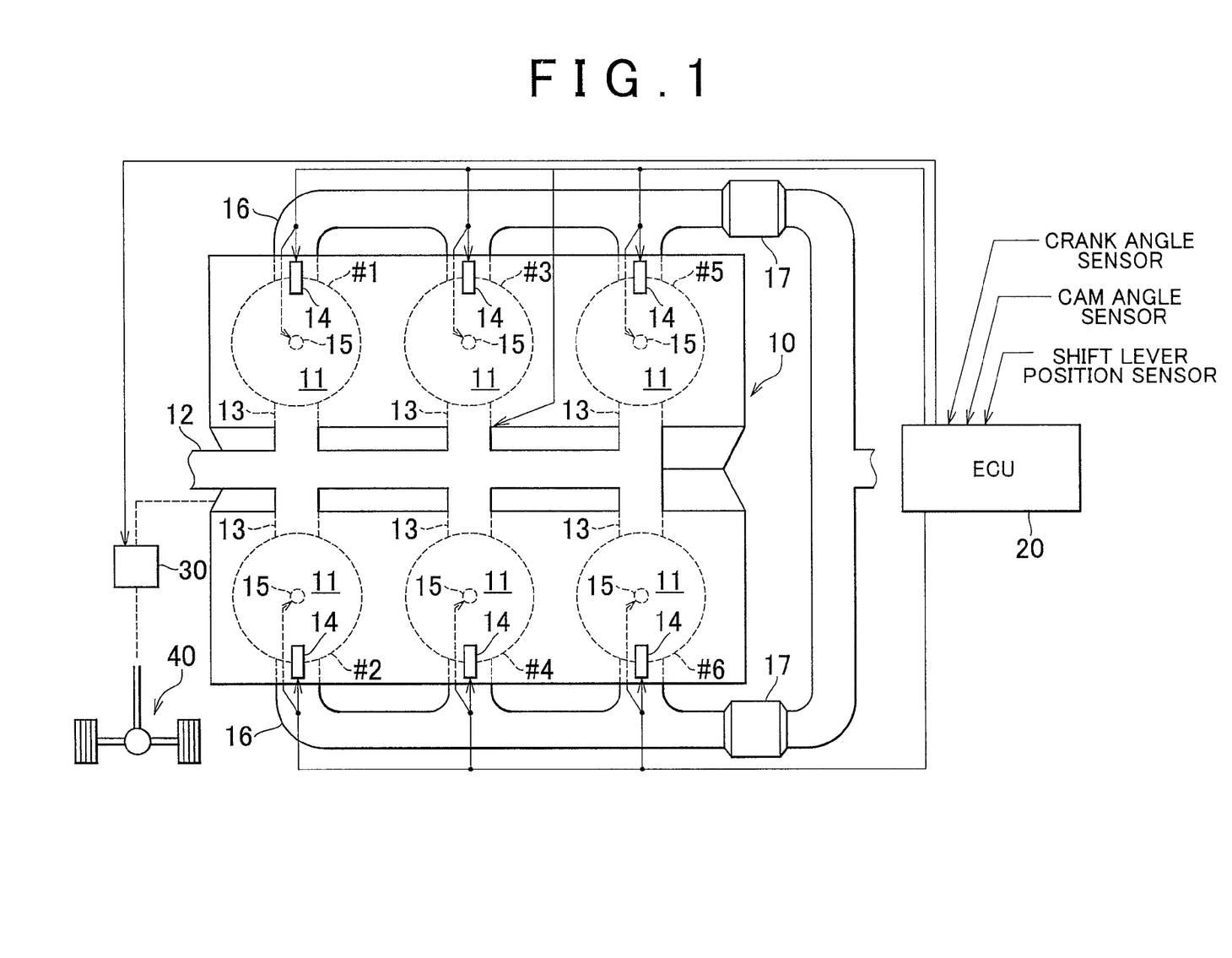
FIG. 1 is a block diagram schematically illustrating an internal combustion engine according to an example embodiment of the invention.

Referring to FIG. 1, an internal combustion engine 10 includes six cylinders #1 to #6, each of which is provided with a spark plug 15. Air is supplied via an intake passage 12 and an intake port 13 to a combustion chamber 11 of each of the cylinders #1 to #6. Further, each of the six cylinders #1 to #6 is provided with a fuel injection valve 14 which injects fuel directly into the combustion chamber 11.

Fuel supplied to the combustion chambers 11 using the fuel injection valves 14 and the air supplied to the combustion chambers 11 form a mixture, which is ignited by the spark plugs 15. Combustion of this mixture produces exhaust gas which is discharged to an exhaust passage 16, which is provided with a catalytic converter 17 that has a three-way catalyst to purify the exhaust gas.

Operation of the internal combustion engine 10 structured as described above is controlled by an electronic control unit (hereinafter simply referred to as "ECU") 20. Detection signals from various sensors, which detect the operating state of the internal combustion engine 10, are input to this ECU 20. Examples of these sensors include a crank angle sensor, which detects the engine speed, i.e., the rotation speed of an engine output shaft, and a cam angle sensor, which detects the phase of a camshaft that drives intake (or exhaust) valves. The phase of the camshaft detected by the cam angle sensor is referenced in the ECU 20 at times such as when distinguishing between cylinders #1 to #6. The ECU 20 controls various components of the internal combustion engine 10, such as the fuel injection valves 14 and the spark plugs 15, based on the detection signals from the various sensors.

With respect to fuel injection control, for example, the ECU 20 controls the fuel injection valves 14 via a drive circuit, not shown. In this control, the ECU 20 sets the fuel injection quantity before the fuel is actually injected from the fuel injection valves 14. That is, the timing at which the fuel injection quantity of each cylinder #1 to #6 is set (i.e., the injection quantity setting timing) before the actual fuel injection timing). Therefore, a fuel injection signal indicative of the set fuel injection quantity is generated and input in advance into the drive circuit. After the fuel injection quantity is set, other engine control parameters are then set based on that fuel injection quantity.

An automatic transmission (hereinafter simply referred to as "AT") 30 is drivingly connected to the internal combustion engine 10. Output from the internal combustion engine 10 (i.e., engine output) is then transmitted via the AT 30 to the driven wheel side of the vehicle, i.e., to a vehicle drive system 40. The AT 30 is drive-controlled in response to a command signal from the ECU 20 based on the position of a shift lever in a shift system arranged in the vehicle cabin. Information regarding the shift lever position is detected by a shift lever position sensor provided in the shift system and input to the ECU 20.

In this example embodiment, the ECU 20 executes a catalyst rapid warm-up control to facilitate warm-up of the catalytic converter 17 immediately after start-up when the engine is cold provided that the shift lever is in the park position (P range) or the neutral position (N range), i.e., provided that the AT 30 is not engaged, and thus is not transmitting engine driving force to the vehicle drive system 40.

This catalyst rapid warm-up control facilitates warm-up of the catalytic converter 17 by retarding the combustion start timing (i.e., expansion start timing), using a retard angle of the ignition timing of the spark plug 15, to raise the temperature of exhaust gas discharged from the combustion chamber 11. While this catalyst rapid warm-up control is being executed, the fuel injection timing is set to the end of the compression stroke, which is right before the ignition timing, so as not to result in a deterioration of the combustion state due to the ignition timing being retarded.

The catalyst rapid warm-up control is not executed when the shift lever of the AT 30 is in the drive position (i.e., the D range) or the like, i.e., when the AT 30 is engaged and thus transmitting engine driving force to the vehicle drive system 40.

In this example embodiment, the fuel injection timing when the catalyst rapid warm-up control is not being executed is fundamentally set to the intake stroke. That is, in this example embodiment, the fuel injection timing is switched from the end of the compression stroke to the intake stroke when the catalyst rapid warm-up control stops being executed. Also, the injection quantity setting timing is set fixed in this example embodiment irrespective of whether the fuel injection timing is switched. That is, the injection quantity setting timing is set fixed to a timing that is a predetermined period of time (a predetermined crank angle) before top-dead-center (TDC) on the compression stroke.

Here, when the shift lever is switched from the park position or the neutral position to the drive position immediately after start-up, when the engine is cold, for example, the AT 30 is engaged from an initially non-transmitting state to a transmitting state, which increases the load on the engine output shaft. This makes decreases in the engine speed likely. After the AT 30 is engaged, the large load continues to be applied to the engine output shaft, which makes it more difficult to bring the engine speed back up in the event that it does decrease. Furthermore, injected fuel does not vaporize as readily when the engine is cold, as it is immediately after start-up. As a result, the combustion state of the internal combustion engine 10 tends to become unstable and the engine speed tends to decrease even more.

A decrease in engine speed can also result, for example, in increased torque fluctuation in the internal combustion engine 10 and even engine stall, so it is desirable that it be quickly suppressed by, for example, increasing the fuel injection quantity. Having the injection quantity setting timing and the actual fuel injection timing set to different timings, however, makes it difficult to quickly suppress a decrease in engine speed. That is, once the injection quantity has been set for a particular cylinder when a decrease in engine speed is detected, even if a fuel injection has not yet been executed in that cylinder, the injection quantity cannot be increased for that fuel injection. Therefore, the fuel injection quantity can only be increased for a cylinder in which an injection quantity has yet to be set after the decrease in engine speed is detected. As a result, the engine speed may decrease further during this time, possibly stalling the engine.

Further, in this example embodiment, when the fuel injection mode switches from executing a compression stroke injection to executing an intake stroke injection, due to, for example, execution of the catalyst rapid warm-up control being stopped as a result of a change in the shift lever position, a larger area of the peripheral wall inside the combustion chamber 11 is exposed during the fuel injection. This causes a temporary increase in the amount of fuel that adheres to the inside chamber wall. That is, the amount of fuel that contributes to combustion temporarily decreases because some of the fuel adheres to the inside chamber wall, making a decrease in engine speed more apt to occur.

Moreover, the load applied to the engine output shaft when the AT 30 is engaged is different than the load applied to the engine output shaft when the AT 30 is not engaged. Therefore, a reference value (i.e., a reference engine speed) when a decrease in engine speed is detected is typically set to be different when the AT 30 is engaged than it is when the AT 30 is disengaged, according to the difference in the load. That is, the reference engine speed when the AT 30 is engaged is set lower than it is when the AT 30 is disengaged in accordance with the difference in the load. Therefore, when the engine speed drops due to the AT 30 switching from the non-transmitting state to the transmitting state, the reference engine speed that is lower at the time that drop is detected is used. As a result, the onset of the increase in the quantity of fuel tends to be late, making it likely that the engine speed will decrease even further.

Therefore, in this example embodiment, which aims to quickly suppress such a decrease in engine speed, when the fuel injection quantity is increased in response to an engine speed decrease being detected, the injection of the supplementary amount of fuel is executed separately from the fuel injection that is normally executed. Moreover, the injection quantity setting timing of the fuel injection for the supplementary fuel injection quantity correction is made to differ from the injection quantity setting timing of the normal fuel injection.

Figure 2:
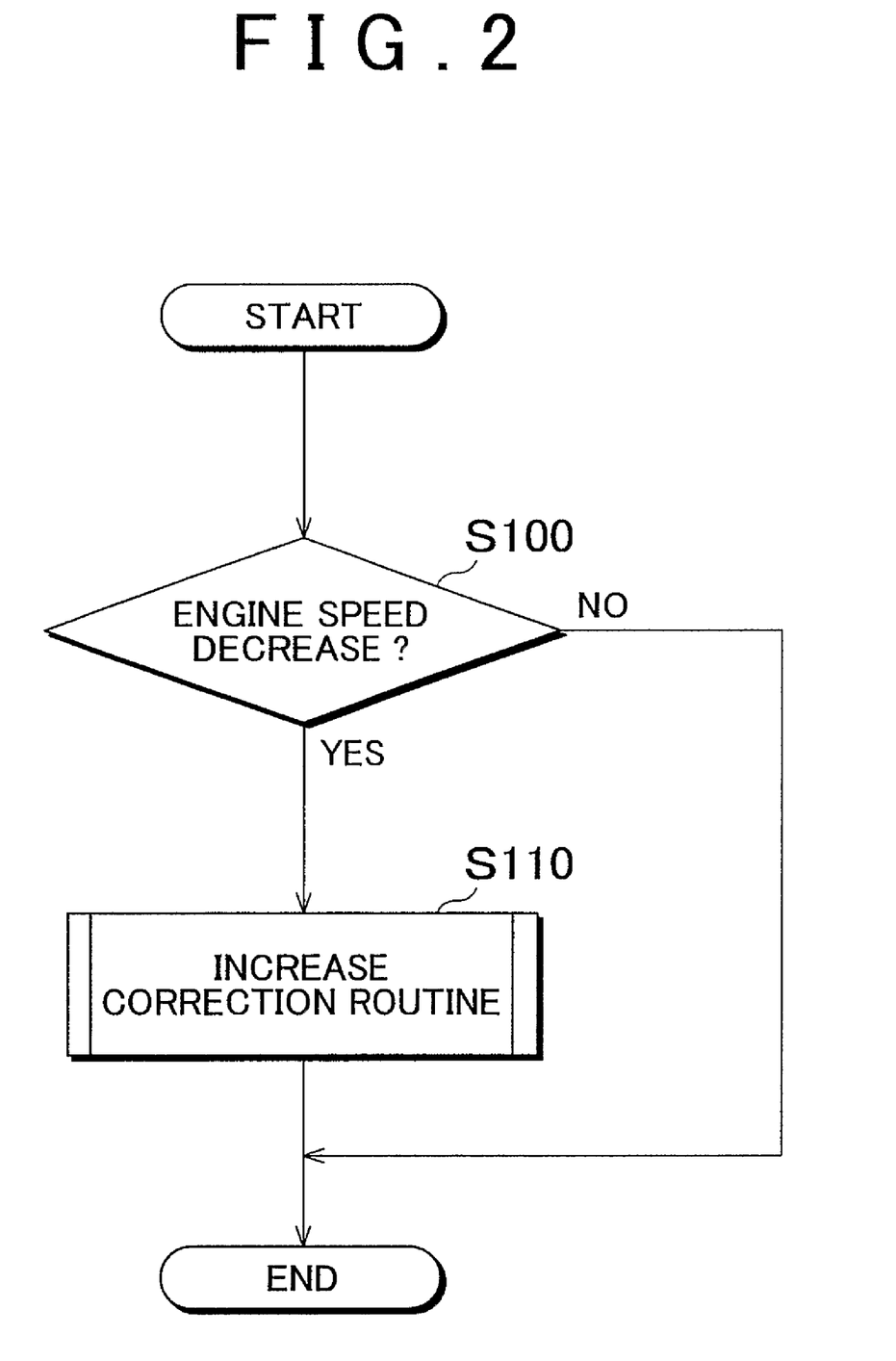
FIG. 2 is a flowchart showing control executed by an electronic control unit to suppress a decrease in engine speed.

Hereinafter, this kind of fuel injection control which is executed by the ECU 20 will be described with reference to the flowcharts shown in FIGS. 2 and 3. The respective control routines shown in these flowcharts are executed at predetermined intervals of time.

The control routine shown in FIG. 2 will be described first. This control routine is executed on the condition that the internal combustion engine 10 is idling, for example. In this routine, it is first determined whether the engine speed is lower than the reference engine speed based on a detection signal from the crank angle sensor (i.e., step S100). If it is determined based on this detection signal that the engine speed is equal to, or greater than, the reference engine speed, then it is determined that there is no drop in the engine speed (i.e., NO in step S100) and this cycle of the routine ends. If no drop in engine speed is detected, normal fuel injection continues.

If, on the other hand, the detection signal indicates that the engine speed is lower than the reference engine speed (i.e., YES in step S100), then it is determined that there is a drop in engine speed and the process proceeds to step S110, where a fuel injection quantity increase routine is executed.

The fuel injection quantity increase routine continues for a predetermined period of time after the drop in the engine speed is detected, i.e., after a YES determination was made in step S100, in order to prevent the fuel injection quantity increase from being executed and then cancelled within a short period of time. The length of the predetermined period is set to be long enough to achieve a combustion state that does not result in the engine speed dropping below the reference engine speed.

Next, the fuel injection quantity increase routine will be described. In the fuel injection quantity increase routine, the injection of the supplementary amount of fuel is executed separately, i.e., in addition to, the normal fuel injection which is executed during normal operation when a drop in the engine speed is not detected (see FIG. 4). The normal fuel injection is generally executed during the intake stroke, except when the catalyst rapid warm-up control is executed. On the other hand, when the supplementary amount (i.e., the supplementary fuel injection quantity) is injected separately from the normal fuel injection, it is injected during the compression stroke in this case.

Further, as described above, the injection quantity setting timing of the normal fuel injection is fixed at a timing a predetermined period (i.e., a predetermined crank angle) before TDC of the compression stroke in this example embodiment. The injection quantity setting timing of the supplementary fuel injection is also fixed at a timing a predetermined period (i.e., a predetermined crank angle) before TDC of the compression stroke. The injection quantity setting timing of the supplementary fuel injection (indicated by the solid triangle in FIG. 4) is set after the injection quantity setting timing of the normal fuel injection (indicated by the solid circle in FIG. 4) when the ignition timing that is set at almost TDC of the compression stroke is made the end point of one cycle.

Figure 4:
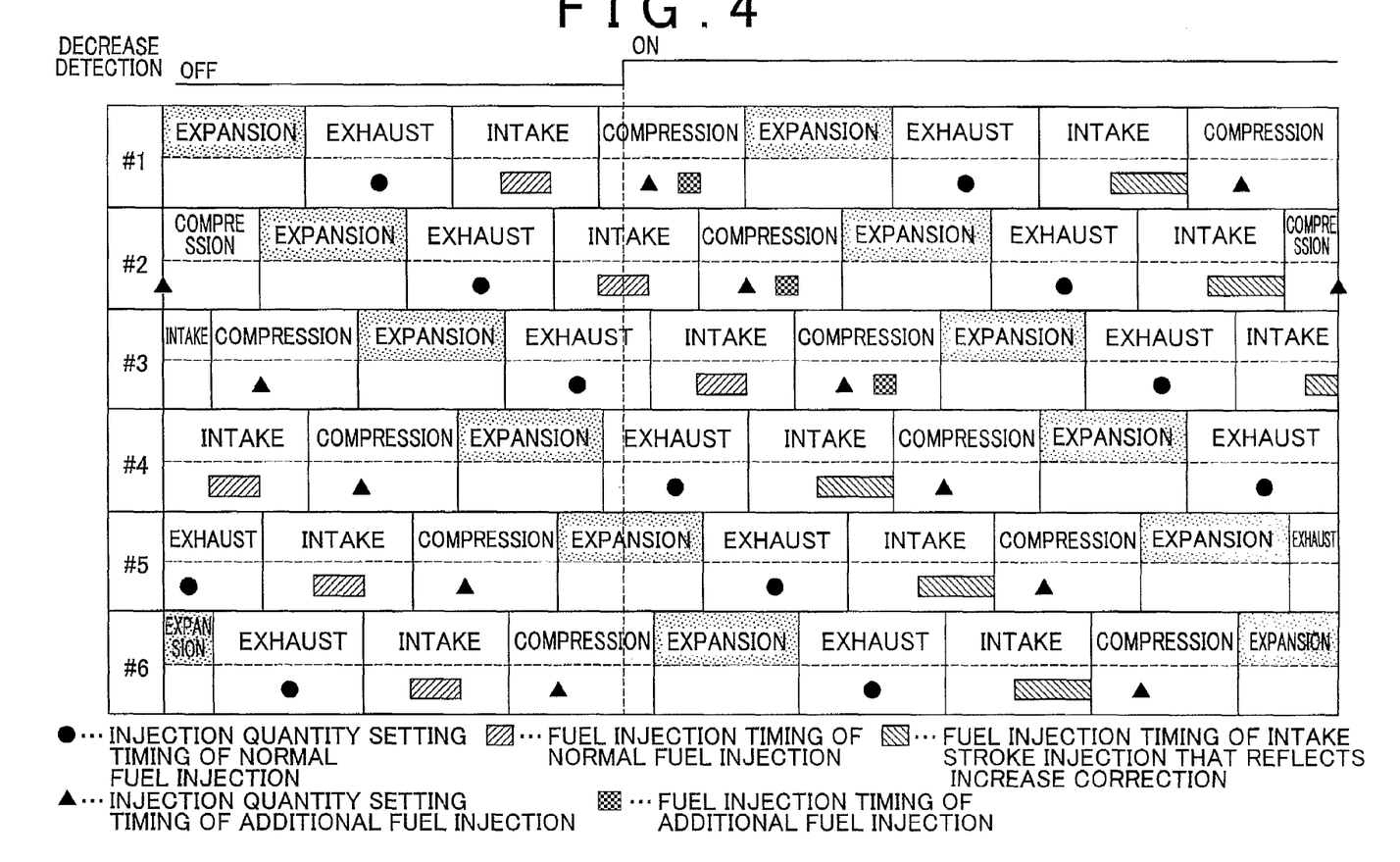
FIG. 4 is a timing chart showing a manner in which the fuel injection quantity is increase-corrected according to this example embodiment of the invention.

Also in this example embodiment, the injection quantity of the normal fuel injection varies in accordance with the operating state of the engine, while the injection quantity of the supplementary fuel injection is fixed. That is, the injection quantity of the normal fuel injection may be set according to the injection quantity calculated based on the operating state of the engine and a timer for that injection quantity is set. When setting the injection quantity of the supplementary fuel injection, on the other hand, a timer for an injection of a fixed quantity is set. These timers are set when a control signal (i.e., the fuel injection signal) generated in the ECU 20 to set the timers is input to the drive circuit of the fuel injection valve 14.

Next, this fuel quantity increase routine will be described with reference to the control routine shown in FIG. 3. This control routine is executed sequentially for cylinders #1 to #6. When the fuel quantity increase routine starts, it is first determined whether the injection quantity setting timing of the normal fuel injection has passed, i.e., whether it is possible to supplement the fuel injection quantity in the injection quantity setting at the injection quantity setting timing (i.e., step S200). In other words, this step determines whether it is possible to perform an intake stroke injection that includes the supplementary amount of fuel.

If the determination is NO, i.e., if it is determined that the intake stroke injection is not possible, then the process proceeds to step S210, where it is determined whether the injection quantity setting timing of the supplementary fuel injection has passed, i.e., whether the supplementary fuel injection for increasing the fuel injection quantity can be executed.

If the determination in step S210 is YES, i.e., if it is determined that the supplementary fuel injection is possible, then the process proceeds on to step S220 and the timer for the supplementary fuel injection is set. In this case, because it is not possible to perform an intake stroke injection that includes the supplemental amount of fuel, only the normal fuel injection is executed during the intake stroke. However, an additional amount for that fuel injection quantity is injected by the supplementary fuel injection, i.e., by a subsequent fuel injection performed at the compression stroke.

In this example embodiment, the quantity of supplementary fuel injected is fixed so it requires almost no time to calculate. Therefore, the fuel injection timing of the supplementary fuel injection is immediately after the injection quantity setting timing of the supplementary fuel injection and set to a fixed timing that is a predetermined period of time (i.e., a predetermined crank angle) before TDC of the compression stroke.

If the determination in step S200 is YES, i.e., if it is determined that an intake stroke injection which includes the supplemental fuel injection quantity is possible, then the process proceeds on to step S230 and a timer for the intake stroke injection is set. This timer is set at the injection quantity setting timing of the normal fuel injection. In this example embodiment, the injection quantity for the intake stroke injection that includes the supplemental fuel injection quantity is set to equal the sum of the injection quantity for the normal fuel injection plus the injection quantity of the supplementary fuel injection (i.e., the amount of the additional fuel to be injected).

Executing this series of control makes it possible to quickly make an increase correction for cylinders for which an increase correction was not possible in the past when the increase fuel injection was not executed. In the same drawing, cylinders #1 to #6 fire in order (i.e., in the order of their respective cylinder numbers).

That is, conventionally in a combustion cycle during which a decrease in engine speed is detected (i.e., having a point at which the detection result switches from OFF to ON), the fuel injection quantities of cylinders #1 to #3, in which the decrease is detected after the injection quantity setting timing, could not be supplemented with additional fuel. According to this example embodiment, however, the decrease is detected before the injection quantity setting timings of the supplementary fuel injections of the cylinders #1 to #3. As a result, the fuel injection quantities of the cylinders #1 to #3 can be quickly increased in the combustion cycle during which the decrease is detected. Moreover, in the cylinders #4 and #5, in which the decrease is detected before the injection quantity setting timing of the normal fuel injection, the supplemental fuel quantity can be injected with an intake stroke injection.

Figure 3:
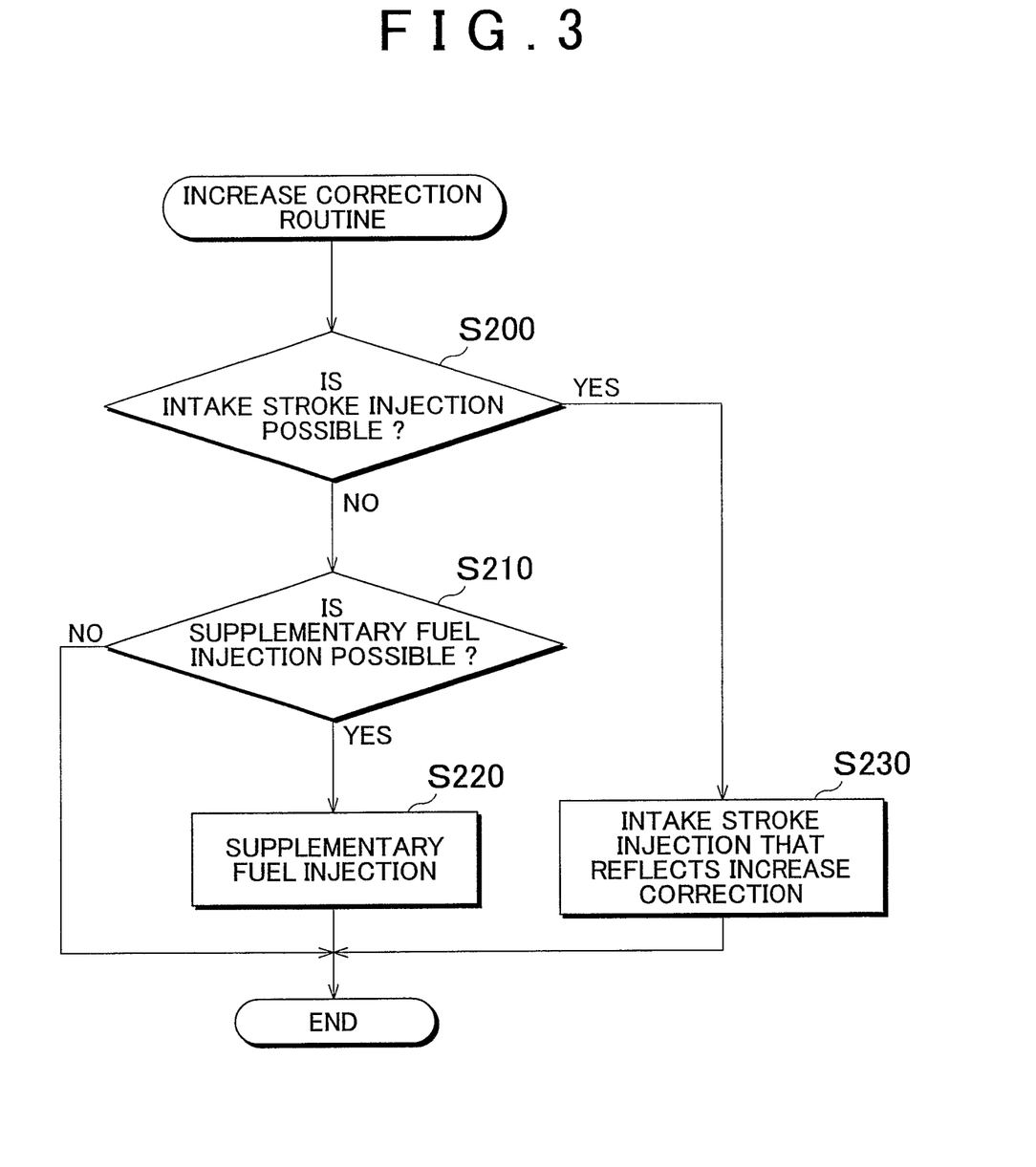
FIG. 3 is a flowchart similarly showing an increase correction routine.

The same drawing shows the detection result as continuously being ON over the period during which the increase correction routine shown in FIG. 3 is continued. In this example embodiment, because the fuel injection-quantity increase correction routine continues for a predetermined period of time after a decrease in engine speed is detected, the supplementary amount of fuel is injected during the intake stroke during the predetermined period in all of the cylinders #1 to #6 that fire after the cylinders #4 and #5.

The following effects are able to be obtained with this example embodiment.

(1) When a decrease in engine speed is detected, a supplementary fuel injection is performed separately from the normal fuel injection, such that the fuel injection quantity is increased. The fuel injection quantity of this supplementary fuel injection is set after the normal fuel injection is performed. Therefore, even if the injection quantity of the normal fuel injection has already finished being set when a decrease in engine speed is detected, the injection quantity of the supplementary fuel injection can be set and the supplementary fuel injection can be executed. As a result, the fuel injection quantity can start to be increase-corrected at an even earlier timing after a decrease in engine speed is detected, so that engine speed decrease can be quickly suppressed.

(2) The normal fuel injection is executed during the intake stroke and the supplementary fuel injection is executed during the compression stroke. As a result, it is possible to ensure a longer interval of time between the injection quantity setting timing of the normal fuel injection and the injection quantity setting timing of the supplementary fuel injection, than when the normal fuel injection and the supplementary fuel injection are both performed during a single stroke, such as during the intake stroke or during the compression stroke, for example. Accordingly, it is possible to increase, to the greatest extent possible, the opportunity for a decrease in engine speed to be detected after the injection quantity of the normal fuel injection has been set, and an injection quantity of a supplementary fuel injection set based on those detection results and that supplementary fuel injection executed.

(3) A plurality of cylinders #1 to #6 are provided and the period of time between the injection quantity setting timing of a normal fuel injection and the injection quantity setting timing of a supplementary fuel injection is set to overlap for any given cylinder and another cylinder, from among those cylinders #1 to #6. This overlap makes it possible for a decrease in engine speed to be detected after the injection quantity of the normal fuel injection has been set, and an injection quantity of a supplementary fuel injection set based on those detection results and that supplementary fuel injection executed in the plurality of cylinders #1 to #6. As a result, a decrease in engine speed can even more quickly suppressed.

(4) The fuel injection quantity of the supplementary fuel injection is set at a fixed quantity. As a result, the time required for setting the fuel quantity of the supplementary fuel injection is reduced, so period between the time that the injection quantity is set and the time that the fuel is actually injected can be made as short as possible. Accordingly, it is possible to maximize the opportunity to detect a decrease in engine speed after the injection quantity of the normal fuel injection has been set, and an injection quantity of an supplementary fuel injection set based on those detection results and that supplementary fuel injection executed.

(5) The increase in the amount of fuel injected is maintained until a predetermined period of time has passed after the decrease in engine speed is detected. Accordingly, once an engine speed decrease has been detected, an increased amount of the fuel continues to be injected until the predetermined period of time has passed even if the engine speed temporarily increases due to the increase in the fuel injection quantity. Therefore, even if the fluctuation in the engine speed is large, as it is immediately after engine start-up, the engine speed can still be increased stably without being adversely affected by that fluctuation.

The foregoing example embodiment is not limited to the description above, but may be modified as follows, for example. The injection quantity of the supplementary fuel injection does not have to be set at a fixed quantity, but may be changed and adjusted depending on the situation.

The injection quantity setting timing of the supplementary fuel injection and the injection quantity setting timing of the normal fuel injection do not have to be set at fixed timings, but may be changed and adjusted depending on the situation. Even in this case, however, the injection quantity setting timing of the supplementary fuel injection is set after the injection quantity setting timing of the normal fuel injection.

In the foregoing example embodiment, the period from the injection quantity setting timing of the normal fuel injection until the injection quantity setting timing of the supplementary fuel injection is set to overlap for any given cylinder and another cylinder, from among the cylinders #1 to #6. Alternatively, however, the periods may be set so that they do not overlap.

The normal fuel injection may be executed during the intake stroke and the supplementary fuel injection may be executed after the injection timing of the normal fuel injection during the intake stroke. The normal fuel injection may be executed during the compression stroke and the supplementary fuel injection may be executed after the injection timing of the normal fuel injection during the compression stroke.

This invention may also be applied to a direct injection internal combustion engine other than a V type in-cylinder injection internal combustion engine. Further, this invention may be applied to a direct injection internal combustion engine having only a single cylinder or a direct injection internal combustion engine having multiple cylinders other than a six cylinder in-cylinder injection internal combustion engine.

In the foregoing example embodiment, the fuel injection quantity is increased based only on a decrease in engine speed that is detected by a crank angle sensor. The invention is not limited to this, however. For example, the fuel injection quantity may also be increased based on whether the AT 30 is engaged, for example. In this case, the fuel injection quantity may also be increased on the condition that a decrease in engine speed has been detected by the crank angle sensor and it has been detected that the AT 30 is engaged. When the AT 30 is engaged, the load applied to the engine output shaft increases, making it likely that the speed will decrease. Moreover, it is difficult to bring the engine speed back up in the event that it does decrease. Accordingly, with this configuration, it is possible to quickly suppress an engine speed decrease in the internal combustion engine 10 in this state. This kind of structure is effective when, for example, the supplementary fuel injection quantity is unnecessary when the AT 30 is not engaged. In this case, the ECU 20 may be configured to detect whether the AT 30 is engaged, as well as detecting a decrease in engine speed with the crank angle sensor.

In addition, in the engagement of the AT 30 may be regarded as a decrease in engine speed. As the AT 30 is engaged, the engine speed is likely to decrease due to the increased load on the engine output shaft, as described above. With this configuration, the fuel injection quantity can be increased as the AT 30 is engaged, which means that a decrease in engine speed can be suppressed even faster. In this case, the ECU 20 may be configured to detect the engagement of the AT 30.

The determination as to whether the AT 30 is engaged may be made based on the position of the shift lever. For example, when the shift lever is in a position (such as the drive position or the reverse position), which engages the AT 30 to transmit engine output, it may be determined that the AT 30 is engaged. Alternatively, for example, when a clutch is provided in the AT, it may be determined that the AT 30 is engaged when that clutch is in a connected state.

An engine speed decrease may also be detected by a crank angle sensor after the catalyst rapid warm-up control is no longer being executed. In this case, an engine speed decrease is detected after the injection mode of the normal fuel injection shifts from executing a compression stroke injection to executing an intake stroke injection when the catalyst rapid warm-up control stops being executed.

Further, in addition to these examples, it may also be determined that the engine speed has decreased when the catalyst rapid warm-up control is not being executed. When execution of the catalyst rapid warm-up control ceases, fuel that adheres to the inner peripheral wall of the combustion chamber 11 temporarily increases, as described above. As a result, the amount of fuel that contributes to combustion temporarily decreases, making it likely that the engine speed will decrease. That is, increasing the fuel injection quantity when the catalyst rapid warm-up control is no longer executed, as described above, enables a decrease in engine speed to be suppressed even earlier.

In the foregoing example embodiment, the catalyst rapid warm-up control is performed, but it does not always have to be. That is, this invention may also be carried out in an internal combustion engine in which the catalyst rapid warm-up control is not applied.

This invention may also be applied to an internal combustion engine that does not have a spark plug 15, such as a diesel internal combustion engine.

While the invention has been described with reference to exemplary embodiments thereof, it is to be understood that the invention is not limited to the exemplary embodiments or constructions. To the contrary, the invention is intended to cover various modifications and equivalent arrangements other than described above. In addition, while the various elements of the exemplary embodiments are shown in various combinations and configurations, which are exemplary, other combinations and configurations, including more, less or only a single element, are also within the spirit and scope of the invention.

The invention claimed is:

1. A fuel injection control apparatus for a direct injection internal combustion engine, comprising:
   detector for detecting a decrease in engine speed; and
   an injection controller for increasing a fuel injection quantity based on the decrease in engine speed being detected by the detector, wherein
   the increased fuel injection quantity is set by the injection controller through the execution of a supplementary fuel injection, the injection quantity of which is set after an injection quantity setting timing of a normal fuel injection that is executed during a same combustion cycle as the supplementary fuel injection, wherein
   the injection controller executes the normal fuel injection during an intake stroke and executes the supplementary fuel injection during a compression stroke.

2. The fuel injection control apparatus for a direct injection internal combustion engine according to claim 1, wherein the fuel injection quantity of the supplementary fuel injection is fixed.

3. The fuel injection control apparatus for a direct injection internal combustion engine according to claim 1, wherein the injection controller maintains the increased fuel injection quantity until a predetermined period of time has elapsed after the decrease in engine speed was detected by the detector.

4. The fuel injection control apparatus for a direct injection internal combustion engine according to claim 1, wherein the detector also detects whether an automatic transmission, which is drivingly connected to the internal combustion engine, is engaged to transmit engine output to a vehicle drive system, and the injection controller increases the fuel injection quantity when the detector detects the decrease in engine speed and also detects that the automatic transmission is engaged.

5. The fuel injection control apparatus for a direct injection internal combustion engine according to claim 1, wherein the detector detects a switching of an automatic transmission from a non-engaged state to an engaged state as the decrease in engine speed, the automatic transmission being drivingly connected to the internal combustion engine to transmit the engine output to a vehicle drive system when engaged.

6. The fuel injection control apparatus for a direct injection internal combustion engine according to claim 5, wherein the detector regards the automatic transmission as being engaged when a shift lever of the automatic transmission is in a drive position.

7. The fuel injection control apparatus for a direct injection internal combustion engine according to claim 1, wherein a shift of an injection mode of the normal fuel injection from execution of a compression stroke injection to execution of an intake stroke injection is detected by the detector as a decrease in engine speed.

8. The fuel injection control apparatus for a direct injection internal combustion engine according to claim 1, wherein the injection controller increases the fuel injection quantity until a predetermined period of time has elapsed after engine start-up.

9. The fuel injection control apparatus for a direct injection internal combustion engine according to claim 4, wherein the detector regards the automatic transmission as being engaged when a shift lever for the automatic transmission is in a drive position.

10. A fuel injection control apparatus for a direct injection internal combustion engine, comprising:
    detector for detecting a decrease in engine speed; and
    an injection controller for increasing a fuel injection quantity based on the decrease in engine speed being detected by the detector, wherein
    the increased fuel injection quantity is set by the injection controller through the execution of a supplementary fuel injection, the injection quantity of which is set after an injection quantity setting timing of a normal fuel injection that is executed during a same combustion cycle as the supplementary fuel injection, wherein
    the internal combustion engine has a plurality of cylinders, and the injection controller sets the period of time between the injection quantity setting timing of the normal fuel injection and the injection quantity setting timing of the supplementary fuel injection for a first cylinder of the plurality of cylinders so as to overlap with the period of time between the injection quantity setting timing of the normal fuel injection and the injection quantity setting timing of the supplementary fuel injection for a second cylinder of the plurality of cylinders.

11. A method for controlling fuel injection in a direct injection internal combustion engine including a cylinder which undergoes an expansion stroke, exhaust stroke, intake stroke, and compression stroke in this order during a combustion cycle, the method comprising:

setting a normal fuel injection to be executed during a predetermined combustion cycle of the cylinder; and setting a supplementary fuel injection to be executed after the normal fuel injection during the predetermined combustion cycle of the cylinder when a decrease in engine speed is detected after the normal fuel injection has been set, wherein the normal fuel injection is executed during the intake stroke of the predetermined combustion cycle, and the supplementary fuel injection is executed during the compression stroke of the predetermined combustion cycle.

12. The method according to claim 11, wherein the quantity of the supplementary fuel injection is fixed.

13. The method according to claim 11, wherein when the decrease in engine speed is detected before the normal fuel injection has been set, the quantity of the normal fuel injection is increased based on the detected decrease in engine speed.

14. The method according to claim 11, wherein if the supplementary fuel injection was executed during the predetermined combustion cycle, the quantity of the normal fuel injection to be executed in a subsequent combustion cycle following the predetermined combustion cycle is increased based on the detected decrease in engine speed.

15. The method according to claim 14, further comprising:
continuing to increase the quantity of the normal fuel injection for a subsequent combustion cycle based on the detected decrease in engine speed until a predetermined period time has elapsed after the decrease in engine speed has been detected.

16. The method according to claim 14, further comprising:
continuing to increase the quantity of the normal fuel injection for a subsequent combustion cycle based on the detected decrease in engine speed until a predetermined period of time has elapsed after engine start-up.

17. The method according to claim 13, wherein the increased quantity of the normal fuel injection is equal to the combined quantities of the normal fuel injection and the supplementary fuel injection that would be injected when the decrease in engine speed is detected after the normal fuel injection has been set.

18. The method according to claim 11, further comprising:
determining whether an automatic transmission, which is drivingly connected to the internal combustion engine, is engaged to transmit engine output to a vehicle drive system; and
executing the supplementary injection if the decrease in engine speed is detected while the automatic transmission is engaged.

19. The method according to claim 11, further comprising:
detecting a switching of an automatic transmission from a non-engaged state to an engaged state as the decrease in engine speed, the automatic transmission being drivingly connected to the internal combustion engine to transmit engine output to a vehicle drive system when engaged.

20. The method according to claim 19, wherein the automatic transmission is regarded as being engaged when a shift lever of the automatic transmission is in a drive position.

21. The method according to claim 11, wherein a shift of an injection mode of the normal fuel injection from execution of a compression stroke injection to execution of an intake stroke injection is detected as a decrease in engine speed.

22. The method according to claim 13, further comprising:
continuing to increase the quantity of the normal fuel injection for subsequent combustion cycle based on the detected decrease in engine speed until a predetermined period time has elapsed after the decrease in engine speed has been detected.

23. The method according to claim 13, further comprising:
continuing to increase the quantity of the normal fuel injection for a subsequent combustion cycle based on the detected decrease in engine speed until a predetermined period of time has elapsed after engine start-up.

24. The method according to claim 18, wherein the automatic transmission is regarded as being engaged when a shift lever of the automatic transmission is in a drive position.

25. A method for controlling fuel injection in a direct injection internal combustion engine including a cylinder which undergoes an expansion stroke, exhaust stroke, intake stroke, and compression stroke in this order during a combustion cycle, the method comprising:

setting a normal fuel injection to be executed during a predetermined combustion cycle of the cylinder; and setting a supplementary fuel injection to be executed after the normal fuel injection during the predetermined combustion cycle of the cylinder when a decrease in engine speed is detected after the normal fuel injection has been set, wherein the internal combustion engine has a plurality of cylinders and the time period between the setting of the normal injection and the setting of the supplementary injection for a first cylinder among the plurality of cylinders overlaps with the time period between the setting of the normal injection and the setting of the supplementary injection for a second cylinder among the plurality of cylinders.

* * * * *